(12) United States Patent
Gommeringer et al.

(10) Patent No.: US 10,713,454 B2
(45) Date of Patent: Jul. 14, 2020

(54) SYSTEM FOR MONITORING THE STATE OF A SCREEN BASKET

(71) Applicant: VOITH PATENT GMBH

(72) Inventors: Christian Gommeringer, Ravensburg (DE); Samee Faraji, Baindt (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/407,428

(22) Filed: May 9, 2019

(65) Prior Publication Data

US 2019/0266368 A1 Aug. 29, 2019

Related U.S. Application Data

(63) Continuation-in-part of application No. 15/568,549, filed as application No. PCT/EP2016/058876 on Apr. 21, 2016, now Pat. No. 10,392,750.

(30) Foreign Application Priority Data

Apr. 23, 2015 (DE) .......................... 10 2015 207 383
Jun. 16, 2015 (DE) .......................... 10 2015 210 990

(51) Int. Cl.
*G06K 7/10* (2006.01)
*G06K 19/07* (2006.01)
(52) U.S. Cl.
CPC ..... *G06K 7/10366* (2013.01); *G06K 19/0723* (2013.01)

(58) Field of Classification Search
USPC .......................................................... 162/374
See application file for complete search history.

(56) References Cited

U.S. PATENT DOCUMENTS

| 9,447,542 B2 | 9/2016 | Erkelenz et al. | |
| 2007/0114157 A1* | 5/2007 | Fredriksson | D21D 5/026 |
| | | | 209/305 |
| 2015/0168255 A1 | 6/2015 | Hamilton et al. | |

FOREIGN PATENT DOCUMENTS

| CN | 104246068 A | 12/2014 |
| CN | 104335022 A | 2/2015 |
| CN | 104335023 A | 2/2015 |
| CN | 104335024 A1 | 2/2015 |
| DE | 102007027688 A1 | 12/2008 |
| DE | 102012208811 B3 | 7/2013 |
| DE | 102012207692 A1 | 11/2013 |
| DE | 102012208795 A1 | 11/2013 |
| WO | 03056215 A1 | 7/2003 |
| WO | 2013160056 A1 | 10/2013 |

\* cited by examiner

*Primary Examiner* — Mark Halpern
(74) *Attorney, Agent, or Firm* — Laurence A. Greenberg; Werner H. Stemer; Ralph E. Locher

(57) ABSTRACT

A system for monitoring the state of a screen basket of a screen for treating a fibrous suspension includes a cable-free identification unit assigned to the screen basket and disposed in a housing of the screen. An external, in particular mobile, reading unit is provided for the non-contact reading of technical data relating to the screen basket from the identification unit and for producing a connection to a further external database containing data relating to the screen.

18 Claims, 1 Drawing Sheet

SYSTEM FOR MONITORING THE STATE OF A SCREEN BASKET

CROSS-REFERENCE TO RELATED APPLICATION

This application is a Continuation-In-Part of U.S. patent application Ser. No. 15/568,549, filed Oct. 23, 2017. This application also claims the priority, under 35 U.S.C. § 119, of German Patent Applications DE 10 2015 207 383.1, filed Apr. 23, 2015 and DE 10 2015 210 990.9, filed Jun. 16, 2015 as well as International Application PCT/EP2016/058876, filed Apr. 21, 2016; the prior applications are herewith incorporated by reference in their entireties.

BACKGROUND OF THE INVENTION

Field of the Invention

The present invention relates to a system for monitoring the state of a screen basket of a screen for treating a fibrous suspension.

The aim during screening is the separation of disruptive solid constituents from fibrous suspensions. Separation is carried out by screening in accordance with the particle features size, shape and deformability. Screening is an important separation method in the preparation of paper for recycling. Different screens are used depending on the level of pulping and the loading of the suspension with foreign materials and fiber specks. Amongst others, so-called basket screens with a screen basket disposed in a housing are used.

In the previously known basket screens, the technical data of the screen basket is stamped onto an end ring of the screen basket. Since the screen basket is disposed in the housing of the relevant screen, reading that technical data is relatively complicated. In addition, the state of wear of the screen basket remains unknown, particularly also since no service life or history for the screen baskets is present and no operating data is available either.

SUMMARY OF THE INVENTION

It is accordingly an object of the invention to provide a system for monitoring the state of a screen basket of a screen for treating a fibrous suspension, which overcomes the hereinafore-mentioned disadvantages and eliminates the problems of the heretofore-known systems of this general type. The intention is in particular to ensure faster fault-free reading of the technical data relating to the screen basket and to permit more comprehensive monitoring of the state of the screen basket from outside.

With the foregoing and other objects in view there is provided, in accordance with the invention, a system for monitoring the state of a screen basket of a screen for treating a fibrous suspension, which comprises a cable-free identification unit assigned to the screen basket and disposed in a housing of the screen and an external, in particular mobile, reading unit for the non-contact reading of technical data relating to the screen basket from the identification unit and for producing a connection to a further external database containing data relating to the screen.

On the basis of this configuration, the technical data relating to the screen basket can be read quickly and reliably in a cable-free and non-contacting manner from outside, i.e. from outside the housing of the screen. In addition, via the external reading unit, further data relating to the screen contained in an external database can be accessed, which means that more comprehensive monitoring of the state of the screen basket is made possible. In this case, as the screen basket is installed, a corresponding item of screen basket information can be read into the external database. When the technical data relating to the screen basket is subsequently read from the identification unit assigned to the screen basket, the necessary allocation of data contained in the database to this screen basket can then be produced. The further data relating to the screen can, for example, be collected via a control system of the factory in which the screen is installed and supplied to the external database. Sales staff and customers can each be issued with an in particular mobile reading unit, so that these can monitor the screen basket from outside, i.e. from outside the housing.

A respective reading unit preferably includes a display for reproducing further data relating to the screen and retrieved from the external database.

According to an expedient practical embodiment of the system according to the invention, the identification unit includes at least one RFID chip (RFID=radio-frequency identification).

Such an RFID chip in particular constitutes a transponder which contains the technical data relating to the screen basket. The transponder is a radio communication device which picks up and automatically answers incoming signals. The coupling can be made by alternating magnetic fields of low range, generated by the reading unit, or by high-frequency radio waves. It is therefore possible not only to transmit data but also to supply the transponder with energy. For greater ranges, an active RFID chip with its own power supply, for example, is also conceivable.

The reading device can contain software which controls the actual reading process for reading the technical data relating to the screen basket from the identification unit or the RFID chip. In addition, the reading unit can include RFID middleware with an interface to the external database.

The identification unit preferably includes at least one RFID chip assigned to the screen basket of the screen.

According to an expedient practical embodiment of the system according to the invention, the identification unit includes both an RFID chip assigned to the screen basket of the screen and also an RFID chip assigned to the housing of the screen, wherein the RFID chip assigned to the screen basket can be coupled via a software coupling to the RFID chip assigned to the housing, and the RFID chip assigned to the housing can be read via the reading unit.

Therefore, the reading unit can produce a connection between the RFID chip assigned to the housing and the external database. In this case, the connection between the RFID chip and the external database is not impaired by the generally metallic housing of the screen.

According to an alternative embodiment of the system according to the invention, however, the RFID chip assigned to the screen basket of the screen can also be readable directly via the reading unit.

In particular in the case in which the RFID chip assigned to the screen basket of the screen can be read directly via the reading unit, the RFID chip assigned to the screen basket of the screen is preferably disposed in the region of the opening of the screen that can be closed via a cover. In order to read the relevant RFID chip, the cover of the screen can then be taken off, whereupon the RFID chip assigned to the screen basket of the screen can be read directly by using the reading unit.

The RFID chip assigned to the screen basket of the screen can in particular be disposed on or in an end ring of the screen basket.

In particular for the aforementioned reasons, it is advantageous if the RFID chip assigned to the screen basket of the screen is disposed on or in an end ring of the screen basket that is adjacent the opening of the screen that can be closed by a cover.

In this case, the RFID chip assigned to the screen basket of the screen is preferably disposed on the upper side of the end ring, facing the opening of the screen.

It is also advantageous in particular if the RFID chip assigned to the screen basket of the screen is disposed on the radial inner side of the end ring, due to which the accessibility of the RFID chip for coupling to the reading unit is further improved.

Also conceivable, for example, is an embodiment in which the RFID chip assigned to the screen basket of the screen is accommodated so as to be countersunk in the end ring. The RFID chip accommodated so as to be countersunk in the end ring of the screen basket is preferably encapsulated in this case in plastic or preferably Teflon. Such a covering is expedient since the screen basket is generally reconditioned, i.e. in particular chromium-plated and electro-polished.

The aforementioned configuration of the RFID chip assigned to the screen basket of the screen on or in an end ring of the screen basket takes into account, amongst other things, the fact that the end rings of a rod-type screen basket with rods extending between these end rings are subject to lower wear than the rods.

The further data relating to the screen is preferably stored together with the technical data relating to the screen basket in the external database. Through the use of the technical data read from the identification unit assigned to the screen basket, the assignment to the further data relating to the screen can thus be made in the external database.

According to a preferred practical embodiment of the system according to the invention, the further data relating to the screen that can be retrieved from the external database via the reading unit includes production data of the screen basket, service life data of the screen basket, operating data of the screen, wear data of the screen basket and/or the like.

In this case, the production data of the screen basket can include, for example, the layout or shape, the material, the size and so on of the screen basket. The service life data of the screen basket can, for example, include data relating to the reconditioning of the screen basket, relating to storage times and so on. The operating data of the screen include, for example, the running time, the flow/pressure at the end ring/outlet of the screen, the rotational speed and so on. This information can be obtained, for example, via the machine control system of the screen.

It is also advantageous in particular if the system according to the invention includes a data-processing device in order, on the basis of the service life of previous screen baskets, the entire throughput previously treated by the screen basket, the rotational speed of the screen basket, the energy balance between the end ring and the outlets of the screen and/or the like, to determine the level of wear of the screen basket and therefore the next change date for the screen basket.

Other features which are considered as characteristic for the invention are set forth in the appended claims.

Although the invention is illustrated and described herein as embodied in a system for monitoring the state of a screen basket, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
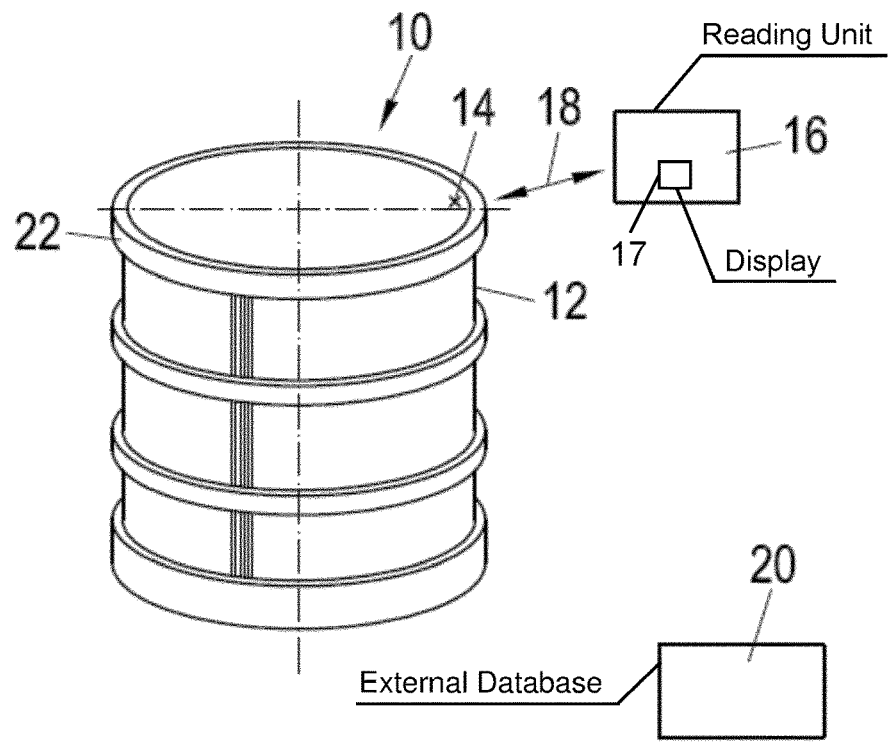
FIG. 1 is a purely diagrammatic, perspective view of an exemplary embodiment of a system according to the invention for monitoring the state of a screen basket of a screen for treating a fibrous suspension.

Referring now to the figures of the drawings in detail and first, particularly, to FIG. 1 thereof, there is seen system 10 for monitoring the state of a screen basket 12 of a screen for treating a fibrous suspension.

Figure 2:
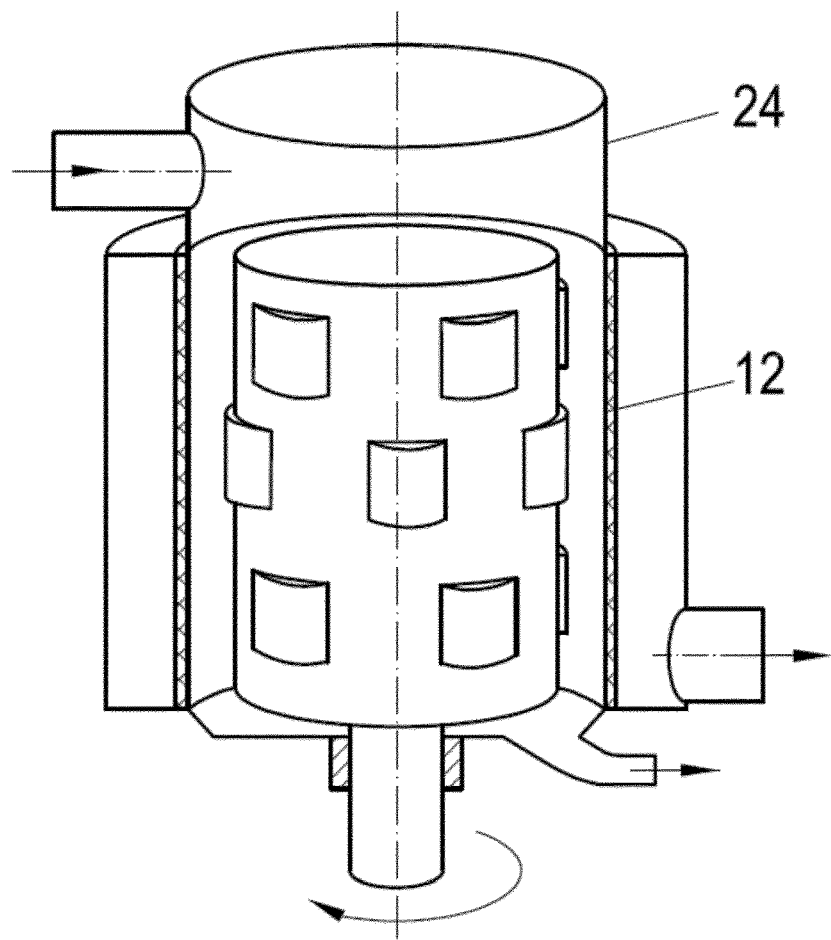
FIG. 2 is a longitudinal-sectional view of the system.

According to FIG. 1, the system 10 includes a cable-free identification unit 14 assigned to the screen basket 12 disposed in a housing 24 of the screen shown in FIG. 2, and an external, in particular mobile, reading unit 16 for the non-contact reading of technical data 18 relating to the screen basket 12 from the identification unit 14 and for producing a connection to an external database 20 containing further data relating to the screen.

The reading unit 16 can include a display 17 for reproducing further data relating to the screen and being retrieved from the external database.

The identification unit 14 can include at least one RFID chip. In this case, it includes at least one RFID chip assigned to the screen basket 12 of the screen.

According to an exemplary embodiment of the system according to the invention, the identification unit 14 can include both an RFID chip assigned to the screen basket 12 of the screen and an RFID chip assigned to the housing 24 of the screen, wherein the RFID chip assigned to the screen basket 12 can be coupled via software coupling to the RFID chip assigned to the housing 24, and the RFID chip assigned to the housing 24 can be read via the reading unit 16.

According to an alternative exemplary embodiment of the system 10 according to the invention, the RFID chip assigned to the screen basket 12 of the screen can also be readable directly via the reading unit 16.

In particular in the case in which the RFID chip assigned to the screen basket 12 of the screen is readable directly via the reading unit 16, the RFID chip assigned to the screen basket 12 of the screen is expediently disposed in the region of the opening of the screen that can be closed via a cover.

The RFID chip assigned to the screen basket 12 of the screen can in particular be disposed on or in an end ring 22 of the screen basket 12 that is adjacent the opening of the screen that can be closed by a cover. In the present case, the RFID chip assigned to the screen basket 12 of the screen is accordingly disposed on or in the upper end ring 22 of the screen basket 12.

The RFID chip assigned to the screen basket 12 of the screen can be disposed, for example, on the upper side of the end ring 22, facing the opening of the screen, or else on the radial inner side of the end ring 22.

However, also conceivable, for example, is an embodiment in which the RFID chip assigned to the screen basket 12 of the screen is accommodated so as to be countersunk in the end ring 22. The RFID chip accommodated so as to be countersunk in the end ring 22 of the screen basket 12 can be provided with a covering formed in particular of plastic and preferably of Teflon. By using such a covering, the fact that the screen basket 12 is generally reconditioned, i.e. chromium-plated and electro-polished, is taken into account.

The further data relating to the screen can be stored together with the technical data relating to the screen basket 12 in the external database 20. Through the use of the technical data 18 read from the identification unit 14 of a respective screen basket 12, the relevant further data contained in the external database 20 can thus be assigned to the screen basket 12.

The further data relating to the screen that can be retrieved from the external database 20 via the reading unit 16 can in particular include production data of the screen basket 12, service life data of the screen basket 12, operating data of the screen and/or the like. The production data of the screen basket 12 includes, for example, data relating to the layout or shape, the material, the size or the like of the screen basket 12. The service life data of the screen basket 12 can include, for example, data relating to the reconditioning of the screen basket 12, storage times and so on. The operating data of the screen includes, for example, data relating to the running time, the flow/pressure at the end ring/outlet of the screen, data relating to the rotational speed of the screen basket 12 and/or the like. The relevant information can in particular be supplied by the machine control system of the screen.

In addition, the system 10 according to the invention, for example, can include a data-processing device integrated in the reading device 16 and/or in the external database 20, in order to determine the level of wear of the screen basket 12 and therefore the next change date for the screen basket 12 on the basis of the service life of previous screen baskets, the entire throughput previously treated by the screen basket 12, the rotational speed of the screen basket 12, the energy balance between the end ring and the outlets of the screen and/or the like.

LIST OF DESIGNATIONS

10 System
12 Screen basket
14 Identification unit
16 Reading unit
17 Display
18 Technical data
20 External database
22 End ring
24 Housing

The invention claimed is:

1. A system for monitoring the state of a screen basket of a screen for treating a fibrous suspension, the system comprising:
   a cable-free identification unit assigned to the screen basket and disposed in a housing of the screen, said identification unit being disposed on or in an end ring of the screen basket or in a region of an opening of the screen to be closed by a cover; and
   an external reading unit for non-contact reading of technical data relating to the screen basket from said identification unit and for producing a connection to a further external database containing data relating to the screen.

2. The system according to claim 1, wherein said external reading unit is a mobile reading unit.

3. The system according to claim 1, wherein said reading unit includes a display for reproducing further data retrieved from the external database and relating to the screen.

4. The system according to claim 1, wherein the data relating to the screen is stored together with the technical data relating to the screen basket in the external database.

5. The system according to claim 1, wherein the data relating to the screen to be retrieved from the external database by said reading unit includes at least one of production data of the screen basket, service life data of the screen basket or operating data of the screen.

6. The system according to claim 1, which further comprises a data-processing device for determining a level of wear of the screen basket and therefore a next change date for the screen basket, based on at least one of a service life of previous screen baskets, an entire throughput previously treated by the screen basket, a rotational speed of the screen basket or an energy balance between an end ring and outlets of the screen.

7. A system for monitoring the state of a screen basket of a screen for treating a fibrous suspension, the system comprising:
   a cable-free identification unit assigned to the screen basket and disposed in a housing of the screen, said identification unit including at least one RFID chip; and
   an external reading unit for non-contact reading of technical data relating to the screen basket from said identification unit and for producing a connection to a further external database containing data relating to the screen.

8. A system for monitoring the state of a screen basket of a screen for treating a fibrous suspension, the system comprising:
   a cable-free identification unit assigned to the screen basket and disposed in a housing of the screen, said identification unit including at least one RFID chip assigned to the screen basket of the screen; and
   an external reading unit for non-contact reading of technical data relating to the screen basket from said identification unit and for producing a connection to a further external database containing data relating to the screen.

9. The system according to claim 8, wherein said RFID chip assigned to the screen basket of the screen is readable directly by said reading unit.

10. The system according to claim 8, wherein said RFID chip assigned to the screen basket of the screen is disposed in a region of an opening of the screen to be closed by a cover.

11. The system according to claim 8, wherein said RFID chip assigned to the screen basket of the screen is disposed on or in an end ring of the screen basket.

12. The system according to claim 8, wherein said RFID chip assigned to the screen basket of the screen is disposed on or in an end ring of the screen basket adjacent an opening of the screen to be closed by a cover.

13. The system according to claim 12, wherein said RFID chip assigned to the screen basket of the screen is disposed on an upper side of the end ring facing the opening of the screen.

14. The system according to claim 12, wherein said RFID chip assigned to the screen basket of the screen is disposed on a radial inner side of the end ring.

15. The system according to claim 12, wherein said RFID chip assigned to the screen basket of the screen is countersunk in the end ring.

16. The system according to claim 15, wherein said RFID chip countersunk in the end ring of the screen basket is provided with a covering or encapsulation.

17. The system according to claim 16, wherein the covering or encapsulation is formed of plastic or Teflon.

18. A system for monitoring the state of a screen basket of a screen for treating a fibrous suspension, the system comprising:
   a cable-free identification unit assigned to the screen basket and disposed in a housing of the screen; and
   an external reading unit for non-contact reading of technical data relating to the screen basket from said identification unit and for producing a connection to a further external database containing data relating to the screen;
   said identification unit including an RFID chip assigned to the screen basket of the screen and an RFID chip assigned to the housing of the screen, said RFID chip assigned to the screen basket being configured to be coupled by a software coupling to said RFID chip assigned to the housing, and said RFID chip assigned to the housing being configured to be read by said reading unit.

* * * * *